Figure 1:
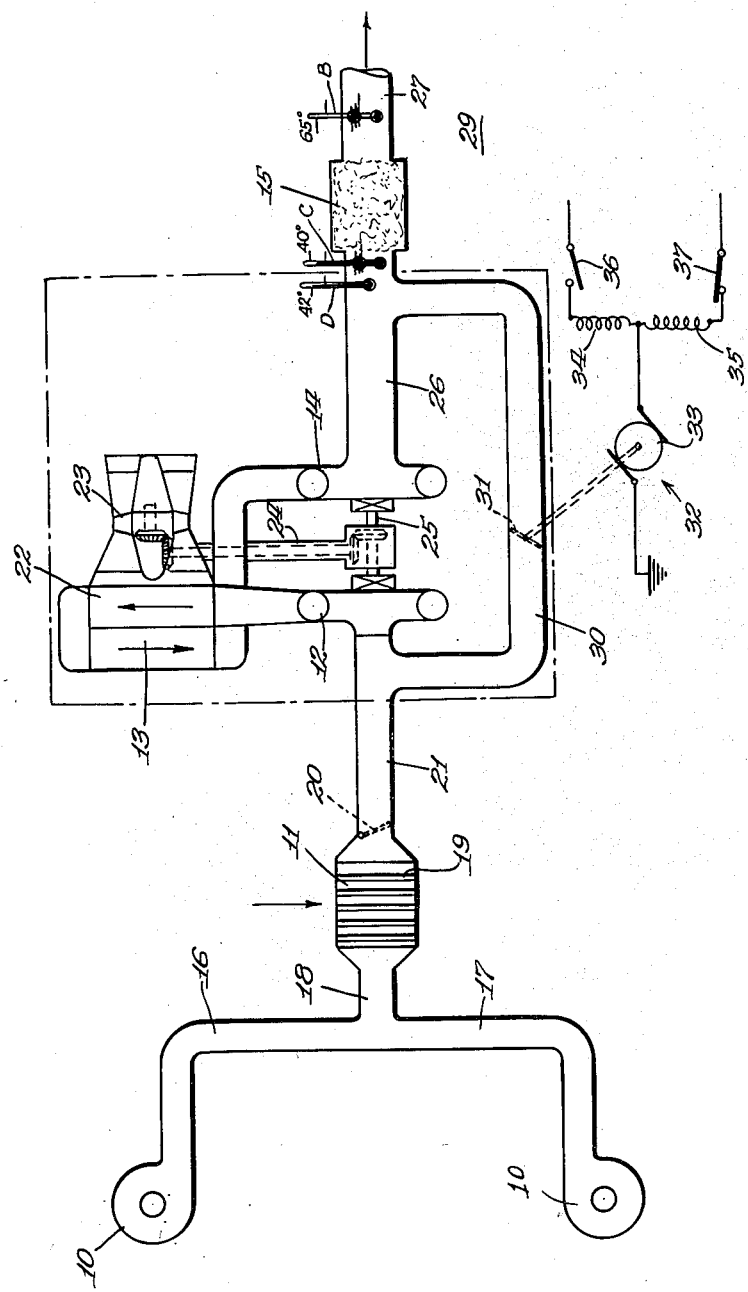

Sept. 4, 1951 T. J. LEHANE ET AL 2,566,617
AIRCRAFT REFRIGERATION CONTROL
Filed Oct. 28, 1949 2 Sheets-Sheet 1

INVENTORS.
Timothy J. Lehane
Edward W. Johnson
BY
Harvey M. Gillespie
Atty.

Sept. 4, 1951 T. J. LEHANE ET AL 2,566,617
AIRCRAFT REFRIGERATION CONTROL
Filed Oct. 28, 1949 2 Sheets-Sheet 2

INVENTORS.
Timothy J. Lehane
Edward W. Johnson
BY
Harvey M. Gillespie
Atty.

Patented Sept. 4, 1951

2,566,617

UNITED STATES PATENT OFFICE 2,566,617

AIRCRAFT REFRIGERATION CONTROL

Timothy J. Lehane, North Riverside, and Edward W. Johnson, Chicago, Ill., assignors to Vapor Heating Corporation, Chicago, Ill., a corporation of Delaware Application October 28, 1949, Serial No. 124,222

11 Claims. (Cl. 62—6)

This invention relates to improvements in temperature control systems for aircraft, and particularly to an automatic cooling system suitable for use on aircraft having pressurized cabins.

A principal object of the invention is to provide a simplified system for controlling the temperature of cooled air delivered to a supercharged aircraft cabin by varying the temperature of the air delivered into the cabin, the temperature of said air being suitably varied by blending together streams of air of different temperatures and reducing the relative humidity of the air preliminary to delivering it into the cabin.

It is customary, in controlling the temperatures of pressurized aircraft cabins, to control the heating and the cooling thereof by means of separate systems. The present control system is illustrated in connection with apparatus for cooling the cabin, since it is during the cooling phase, in situations of the character contemplated, that the greatest difficulties are encountered.

An air cooling apparatus for aircraft of the above class, ordinarily includes one or more primary compressors which draw in outside air and compress it to a pressure sbstantially higher than is required to be maintained in the cabin. For example, air taken in at fourteen pounds per square inch may be compressed to twenty-eight pounds per square inch. This compression of the air raises its temperature to such extent that it must be cooled before it is introduced into the cabin. Te cooling of the compressed air is effected by two cooling apparatuses. It is first passed through a primary cooler adapted to remove approximately one-half of the heat generated in the air as a result of its compression. The compressed and partly cooled air is then passed through a refrigerator wherein the air is reduced to a relatively low temperature, usually near the freezing point of water. The air discharged from the refrigerator apparatus usually contains a large percentage of moisture and is passed through a moisture extractor to remove the surplus moisture from the air before it is delivered into the cabin.

In order to obtain efficient operation and maximum moisture extraction from the air it is desirable to cool the air to as low temperatures as possible without likelihood of blocking the system by freezing the extracted moisture in the separator. However, the freezing of water in the separator and consequent blocking of the delivery of air to the cabin has been a major difficulty encountered in aircraft cooling systems of the above class heretofore used.

The present invention contemplates a simplified automatic system for controlling the temperatures of the air delivered into the cabin, which system also insures maintaining the air within the moisture extractor slightly above freezing at all times.

Another feature of the invention includes the provision of manual controls for opening and closing a by-pass valve for delivering heated air to the moisture extractor, but the manual control is made subject, under certain conditions, to the automatic safety features embodied in the automatic control to prevent freezing and blocking of the system at the moisture extractor.

The invention stated briefly comprises means including an air duct and a valve therein for directing variable quantities of heated air direct from the primary cooler, of a conventional cooling system, to the water extractor. This air, containing a substantial quantity of heat generated by the primary compression of the air, is blended with the lower temperature air discharged from the refrigerator apparatus so as to raise the temperature of the blended air mixture sufficiently to prevent freezing of the moisture therein. This result is obtained automatically by means of a by-pass conduit for directing heated air from the primary cooler direct to the moisture extractor. The volume of heated air delivered being controlled by means of an electrically operated valve, and means for controlling the valve operating means including a pair of thermostats positioned in the air delivery ducts one of which is set to function at the lower limit, slightly above freezing, of a predetermined temperature range to cause movement of the by-pass valve in a direction to increase the volume of heated air delivered to the moisture extractor. The other thermostat of the pair is set to function at the upper limit of said temperature range to cause movement of the by-pass valve in a direction to reduce the volume of heated air delivered to the moisture extractor. The temperature range may be varied in effect by applying electrical heat to the thermostat of lower temperature setting so that this thermostate will cycle and thereby automatically adjust itself to variations in freezing temperatures at higher altitudes.

A similar control of the by-pass valve is effected by means of a thermostat having spaced contacts defining the upper and lower limits of a temperature range to be maintained within the cabin and cooperating with the said duct thermostat and relays controlled thereby increase the delivery of heated air through the by-pass when the cabin thermostat breaks its lower contact and decreases the delivery of heated air through the by-pass when the cabin temperature reaches the upper limit of the cabin temperature range.

There is also a second thermostat responsive to the temperature of the delivery air and set to function at a predetermined temperature of the delivered air. The purpose of this thermostat is to adjust the functional setting of the cabin thermostat in anticipation of a change of temperature within the cabin, due to the change in temperature within the air delivery duct which has not yet been reflected by a change of temperature in the cabin.

Figure 2:
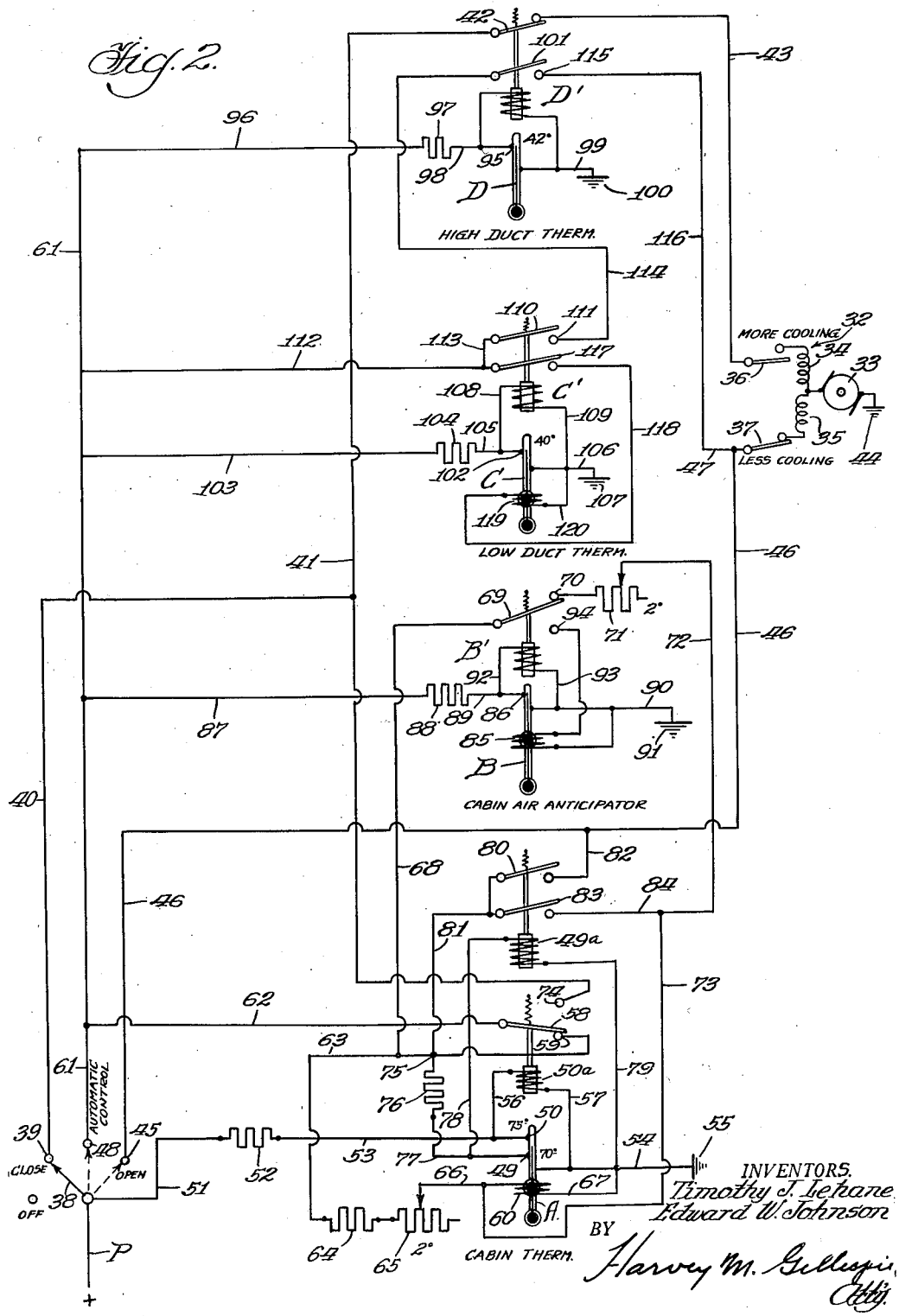

The invention is illustrated in the accompanying drawings wherein:

Fig. 1 is a conventional form of apparatus, modified according to the present invention, for delivering compressed and cooled air into an enclosed space, for example a pressurized cabin of aircraft, and Fig. 2 is a diagram of the control circuits for so controlling the temperature of refrigerated air delivered to the cabin as to maintain the desired temperature therein and maintain suitably low temperatures in the dehumidifier or moisture extractor to insure efficient separation without freezing.

A conventional type of apparatus for compressing and cooling air for delivery into a pressurized cabin of an airplane is illustrated in Fig. 1 as comprising a pair of primary air compressors 10, a primary cooler 11, a secondary compressor turbine 12, a heat exchanger 13 for further cooling the air, an expansion turbine 14, and an air dehumidifier or moisture extractor 15.

The primary compressors 10 draw in external air and compress it to a pressure substantially higher than that required for delivery into the cabin. The compressing operation raises the temperature of the air to approximately 300° F. It is then conducted through connecting conduits 16, 17 and 18 to the primary cooler 11. This device may be of a conventional honey-comb construction in which external air is forced through a plurality of cooling ducts 19 by the movement of the aircraft through the atmosphere. The ducts 19 extend across an enclosed casing, while the heated air from the compressors 10 is passed in heat exchanging relation around the outer surfaces of the ducts. A manually controlled valve 20 is positioned at the discharge end of the primary cooler 11 so as to control the discharge of air from the said cooler. The air is discharged from the cooler 11 at a pressure of approximately twenty-eight pounds per square inch and at a temperature of approximately 150° F. The air is then conducted through conduit 21, the secondary compressor turbine 12, air duct 22 and heat exchanger 13, and thence discharged through the expansion turbine 14. The turbine, as before indicated, is utilized to operate a fan 23 of the heat exchanger structure. The fan, therefore, is gear connected as at 24 with the turbine shaft 25.

The cooled air is conducted through conduit 26 to the moisture extractor 15 and thence through delivery duct 27 into the aircraft cabin 29.

A large portion of the heat is dissipated from the compressed air during its passage through the heat exchanger 13, the air being delivered into the moisture extractor at a pressure of approximately fifteen pounds pressure and at a relatively low temperature. The relative humidity of the low temperature air is usually quite high. However, the surplus moisture is removed from the air as it is passed through the separator 15.

The apparatus thus far described is conventional structure for aircraft having pressurized cabins. The present invention is directed to the means for controlling the temperature of the atmosphere within the cabin and for also controlling the temperature of the air within the moisture extractor so as to maintain a suitably low temperature in the separator without danger of freezing the water therein.

The applicants' improvements include the provision of a by-pass conduit 30 connected in conduits 21 and 26 so as to divert heated air (approximately 150°) direct from the primary cooler 11 to the moisture extractor 15, where it is blended with the lower temperature air from the heat exchanger 13 to raise the temperature of the air entering moisture extractor 15. The temperature of 40° F. is selected as a convenient minimum and is not critical. However, it is sufficiently high to be clear of the normal increase in the freezing point of water at higher altitudes.

The volume of heated air delivered to the separator 15 is controlled by means of a valve 31 located in the by-pass conduit 30. This valve may be moved to either its fully open or fully closed position or to any desired intermediate position by means of a reversible electric motor 32.

The said motor 32 is shown diagrammatically as comprising an armature 33, field windings 34 and 35 for imparting forward and reverse movements, respectively, to the motor armature, and limit switches 36 and 37; the switch 36 being open and the switch 37 closed when the valve 31 is in its fully closed position so that the motor can be energized only to open the valve. When the motor is operated to move the valve 31 to its fully open position the limit switch 37 opens and the limit switch 36 remains closed so that the next operation of the motor can be effected only in a direction to move the valve 31 toward its closed position. However, when the valve 31 is in any position intermediate its fully open and fully closed positions, both limit switches 36 and 37 are closed so that the motor may be actuated in either direction, as may be required to alter the temperature of the blended air entering the separator by increasing or decreasing the delivery of heated air through the by-pass conduit 30 to the entrance end of the saparator 15.

The motor 32 can be energized manually to close valve 31 by positioning a switch 38 into engagement with a contact 39 (Fig. 2). In such event a motor energizing circuit leads from the positive line P through manual switch 38 and contact 39, wires 40, 41, closed relay contact 42, wire 43, closed limit switch 36, motor field winding 34 and armature 33 to ground 44. The motor 32 is shown in its valve closed position as a result of the closing of the above circuit. If it should be open the valve manually to increase the delivery of heated air through the by-pass conduit 30 to the moisture extractor 15, this can be accomplished by moving the manual switch into engagement with fixed contact 45 (Fig. 2). Whereupon a motor energizing circuit is closed to energize the motor in a direction to open valve 31. This circuit leads from positive line P through manual switch 38, fixed contact 45, wires 46 and 47 through closed limit switch 37, field coil 35, and armature 33 to said ground 44.

When the control system is to function automatically, the manual switch 38 (Fig. 2) is moved into engagement with fixed contact 48. This position of switch 38, conditions the motor 32 and may be controlled by mechanism responsive to temperature changes in the cabin 29 and to temperature changes in the conduit 26 at the entrance end of the moisture extractor 15.

The automatic control means includes a cabin thermostat A (Fig. 2) provided with lower and upper contacts 49 and 50 defining the lower and upper limits of a predetermined temperature range. It is desirable, during the cooling cycle, to maintain the cabin temperature between 70° and 75° F. Therefore, the lower contact, in the present illustration, represents a temperature setting of 70° F. and the upper contact 50 represents a temperature setting of 75° F. The cabin thermostat controls the energization of two relays designated 49ᵃ and 50ᵃ. The relay 49ᵃ is connected in shunt with the lower contact 49 of thermostat A and relay 50ᵃ is connected in shunt with the upper contact of the thermostat. Considering first the electrical circuits for the upper contact 50 and its associated relay 50ᵃ: The circuit connections through said upper contact 50 leads from the positive line P through wire 51, resistor 52, wire 53 to contact 50 and thence through the mercury column of thermostat A to wire 54 and ground 55. The actuating solenoid of relay 50ᵃ is connected in wires 53 and 54 at opposite sides of the thermostat by means of branch conductors 56 and 57. Consequently, when the mercury column of thermostat A stands below contact 50, the relay 50ᵃ is energized to close its contact 58 against contact 59 and thereby close two circuits through an electrical heater 60 for applying heat to thermostat A so as to the bias its mercury column toward said upper contact. One of these heating circuits leads from positive line P through manual switch 38 and contact 48 to bus conductor 61, branch conductor 62, relay contacts 58, 59, wire 63, fixed resistor 64, variable resistor 65, wire 66, electric heater 60 and wires 67 and 54 to ground 55. With the adjustment of variable resistor as shown, approximately 2° of heat is applied to the thermostat A. Another 2° of heat is added to the thermostat, if the cabin temperature is above 65. This circuit leads from wire 63 through wire 68, contacts 69, 70 of relay B', variable resistor 71 (adjusted to pass current equivalent to 2°) thence through wires 72, 73 and 66 to the heater 60, thence through wires 67 and 54 to ground 55. Hence, assuming that the mercury column is standing between thermostat contacts 49 and 50 the heat applied to the thermostat through heater 60 will cause the mercury column to again engage the upper contact 50. The closing of said upper contact 50 deenergizes the relay 50ᵃ so as to open said heating circuits and to engage contact 74 to close an energizing circuit through motor 32. This circuit leads from deenergized relay contacts 58 and 74 through wire 41, contact 42 of deenergized relay D' and wire 43 through closed limit switch 36, field 34 and armature 33 to ground 44. The cycling of thermostat A off its upper contact will continue until the valve 31 is closed sufficiently to reduce the delivery of heated air into the mixture and thereby increase the cooling effect on the cabin air until the mercury column of thermostat A will stand between its contacts 49 and 50.

If the above cooling of the cabin continues until the mercury column of the cabin thermostat A recedes below its lower contact an energizing circuit is closed through the actuating solenoid of relay 49ᵃ to close a reverse circuit through valve motor 32. The control circuits through the lower contact 49 of thermostat A are as follows: The main circuit through the said lower contact 49 leads from bus conductor 61 through branch 62, energized closed contacts 58, 59 of relay 50ᵃ, wire 63 to junction 75 thence through resistor 76 and wire 77 to the lower contact 49, mercury column of thermostat A and wire 54 to ground 55. The actuating solenoid of relay 49ᵃ is connected in wires 77 and 54 at opposite sides of the thermostat A by means of wires 78 and 79, respectively. Consequently, when the lower contact 49 of the thermostat is opened energizing current is passed through the solenoid of relay 49ᵃ and thereby moves its contact arm 80 to close an energizing circuit through valve motor 32 in a direction to increase the delivery of heated air through by-pass conduit 30 and thereby reduce the cooling effect of the refrigerated air delivered into the cabin. This energizing circuit leads from said junction 75 in wire 63 through wires 81, energized closed contact 80 of relay 49ᵃ, wires 82, 46 and 47, through closed limit switch 37, field winding 35 and armature 33 of motor 32 to ground 44. Simultaneously with the closing of the last mentioned circuit, a heating circuit is closed through contact 83 of relay 49ᵃ, through wires 84, 73 and 66 to the heater 60 and thence through wires 67 and 54 to ground 55. This heating circuit is not impeded by resistors and therefore applies a large amount of heat to the thermostat A to quickly return the mercury column into engagement with contact 49 and thereby deenergize relay 49ᵃ and to interrupt the opening movement of by-pass valve 31. This cycling action will continue until the temperature of the cabin has increased sufficiently to cause the mercury column to assume a position intermediate the contacts 49 and 50 of the cabin thermostat.

In the event that the temperature of the air in the delivery duct 27 should at any time fall below a point normally sufficient (for example 65° F.) to maintain the minimum temperature of 70° within the cabin, a thermostat B positioned in the air delivery duct will break contact and thereby energize its associated relay B' to break the heating circuit through variable resistor 71. This action of relay B' does not have much effect because of the small amount of heat removed in relation to the large amount supplied through the energized closed contact 83, but the removal of the 2° of heat from the thermostat A, by opening the contacts 69 and 70 of relay B', effects a major adjustment of said thermostat A when conditions are otherwise sufficient to maintain the mercury column between contacts 49 and 50 of the cabin thermostat.

As long as the delivery duct temperature remains below the temperature setting of thermostat B, the thermostat and its associated relay is caused to cycle by the intermittent application of a large volume of heat to the thermostat heater 85. The main circuit through the thermostat contact 86 leads from bus conductor 61 through wire 87, resistor 88 and wire 89, contact 86 and thence through the mercury column and the wire 90 to ground 91. The actuating solenoid of relay B' is connected in shunt in wires 89 and 90 at opposite sides of the thermostat B by means of wires 92 and 93. The circuit through heater 85 is momentarily closed to direct a large volume of heating current thereto by the closing of the contacts 69 and 94 of relay B.

In order to prevent the temperature at the moisture extractor from falling below 40° F. at any time during the time the cabin thermostat A calls for more cooling, a pair of thermostats C and D are positioned in the air duct 26 at the entrance of the moisture extractor 15. The thermostat C is set to function at 40° F. and the thermostat D is set to function at a duct temperature of 42° F. The main control circuit through contact 95 of thermostat D leads from the bus conductor 61 through wire 96, resistor 97 and wire 98 to thermostat contact 95 and thence through the mercury column of the thermostat and wire 99 to ground 100. The thermostat D controls the energization of a relay D'. The actuating solenoid of relay D is connected in shunt in wires 98 and 99 at opposite sides of the thermostat. Consequently, when the duct temperature at thermostat D stands at 42° F. or higher the contact arms 42 and 101 thereof are in the position shown in Fig. 2 of the drawing. In this position of the relay contact 42, the circuit through the motor field winding 34 is in condition to be energized to move the valve 31 toward its closed position, upon a call for more cooling at thermostat A, or upon the movement of the manual switch 38 into engagement with contact 39. Under the latter condition, a fall of the temperature below 42 is impossible when the cabin thermostat is calling for more cooling. Also when the manual switch 38 is positioned for automatic control, any time the temperature at the thermostat falls below 42° F., the relay D' is energized to open the motor circuit through field winding 34 and condition a circuit through the field winding 35, whereby the motor 32 will operate in a reverse direction to move valve 31 toward its open position when the temperature at thermostat C causes it to break contact at 40° F.

The thermostat C controls the energization of relay C' so that when the duct temperature at the thermostat C falls below 40° F., while the cabin thermostat is calling for more cooling or at any time when the full automatic control is effective, the relay C' will be energized to close a circuit through field 35 of motor 32 to move the valve 31 in a direction to deliver a larger quantity of heated air from the primary cooler 11 through the by-pass duct 30 so as to increase the temperature of the refrigerated air delivered into the cabin 29.

The main circuit through the contact 102 of thermostat C leads from the bus conductor 61 through wire 103, resistor 104 and wire 105 to the contact 102 and thence through the mercury column of the thermostat and wire 106 to ground 107. The relay C' has its actuating solenoid connected in shunt with the thermostat C by means of connections 108 and 109 connected in wires 105 and 106 at opposite sides of the thermostat. Consequently, when the temperature at thermostat C falls below 40° F., the thermostat breaks contact and thereby directs energizing current through wire 108 to the solenoid of relay C'. The energization of said relay C' closes its contacts 110 and 111 to direct an energizing circuit through field winding 35 of valve motor 32 to impart opening movement to valve 31. This circuit leads from bus connector 61 through wires 112 and 113, contacts 110 and 111 of relay C', wire 114, contacts 101 and 115 of relay D', wires 116, 47, limit switch 37 and motor field 35, and thence through motor armature 33 to ground 44. Simultaneously with the closing of the last mentioned motor circuit the relay contact 117 closes a heating circuit through an electric heater 119 for applying a large amount of heat to the thermostat C so as to effect cycling operation thereof. This cycling or heating circuit leads from contact 117 of relay C through wire 118, heater 119 and wires 120 and 106 to ground 107.

We claim:

1. In a temperature control system for a pressurized aircraft cabin, the combination with means for compressing air, a primary cooler for extracting from the compressed air a portion of the heat generated by said compression, means for further cooling said air, and means for extracting surplus moisture from the cooled air; of means for controlling the temperature of the atmosphere within the cabin and for preventing possible freezing of moisture in said moisture extractor comprising means defining a conduit by-passing said cooling means and adapted to deliver a portion of the heated air direct from said primary cooler to said moisture extractor to raise the temperature of the refrigerated air therein, a valve for controlling the volume of by-passed air delivered, electrical means responsive to selected temperatures within the cabin for adjusting the position of said valve, and means responsive to a predetermined low temperature in said moisture extractor for controlling said valve adjusting means to maintain the temperature within said moisture extractor above freezing.

2. A temperature control system for a pressurized aircraft cabin as defined in claim 1 characterized in that the means responsive to the temperature within the said moisture extractor responds to temperatures representing the upper and lower limits of a predetermined temperature range.

3. A temperature control system for a pressurized aircraft cabin as defined in claim 2 characterized in that the portion of the valve adjusting means which responds to the temperatures within the cabin comprises a thermostat provided with spaced contacts representing the upper and lower limits of a predetermined temperature range to be maintained in the cabin.

4. A temperature control system for a pressurized aircraft cabin as defined in claim 3 characterized in that the cabin temperature responsive means include a relay connected in shunt with thermostat contact representing the lower limit of the temperature range to be maintained in the cabin, and circuit means controlled by said relay for moving the by-pass valve in a direction to increase the delivery of heated air when the cabin thermostat breaks its lower contact.

5. A temperature control system for a pressurized aircraft cabin as defined in claim 3 characterized in that the cabin temperature responsive means include a relay connected in shunt with thermostat contact representing the upper limit of the temperature range to be maintained in the cabin, and circuit means controlled by said relay for moving the by-pass valve in a direction to decrease the delivery of heated air when the cabin thermostat closes its upper contact.

6. A temperature control system for a pressurized aircraft cabin as defined in claim 5 characterized in that the means responsive to the temperature of the moisture extractor comprises a thermostat set to function at the upper limit of said predetermined temperature range for said moisture extractor, and provided also with a relay connected in shunt with said thermostat, whereby the functioning of the thermostat de-energizes the relay, the relay having a deenergized contact connected in the electrical circuit for operating the valve operating means to decrease the delivery of heated air through said by-pass conduit.

7. A temperature control system for a pressurized aircraft cabin according to claim 6 in which the means responsive to the temperature of the moisture extractor comprises also a low limit thermostat set to function at the lower limit of the temperature range for said moisture extractor, a relay connected in shunt with the low limit thermostat for closing a circuit through said valve operating means to operate said valve in a direction to increase the delivery of heated air to said moisture extractor.

8. A temperature control system for a pressurized aircraft cabin according to claim 7 in which the relay controlled by the thermostat which is set to function at the upper limit of the temperature range maintained thereby includes an energized closed contact in series with the contact of the low temperature duct thermostat for closing an energizing circuit through said valve operating means, whereby the last mentioned circuit can be closed only when the high temperature duct thermostat is open at its contact.

9. A temperature control system for a pressurized aircraft cabin according to claim 8 characterized by the provision of an electric heater for the low temperature duct thermostat and an energized closed contact for the relay controlled by said low temperature duct thermostat for closing an energizing circuit through said heater when the said low temperature thermostat is open.

10. A temperature control system for a pressurized aircraft cabin according to claim 9 characterized by the provision of a thermostat responsive to the temperature of the air and set to function at a temperature below the low temperature setting of said cabin thermostat, an electric heater for adding heat to the cabin thermostat, and a relay controlled by the air delivery thermostat for closing an energizing circuit through the last mentioned heater when air delivery thermostat is closed.

11. A temperature control system according to claim 10 provided with a manually operable switch for closing energizing circuits through said valve operating mechanism for increasing and decreasing the temperature of the cabin and said moisture extractor.

TIMOTHY J. LEHANE.
EDWARD W. JOHNSON.

REFERENCES CITED

The following references are of record in the file of this patent:

UNITED STATES PATENTS

| Number | Name | Date |
| --- | --- | --- |
| 2,485,522 | Andersen | Oct. 18, 1949 |
| 2,496,602 | Schlichtig | Feb. 7, 1950 |

OTHER REFERENCES

"Refrigeration For Air Conditioning Pressurized Transport Aircraft"; by Bernard L. Messinger in S A E Journal (Transactions), vol. 54, No. 2, March 1946, pages 93–106.